(12) United States Patent
Yang et al.

(10) Patent No.: US 8,940,181 B2
(45) Date of Patent: Jan. 27, 2015

(54) EMULSIONS OF HEAT TRANSFER FLUIDS INCLUDING NANODROPLETS TO ENHANCE THERMAL CONDUCTIVITIES OF THE FLUIDS

(75) Inventors: Bao Yang, Silver Spring, MD (US); Zenghu Han, College Park, MD (US)

(73) Assignee: University of Maryland College Park, College Park, MD (US)

( * ) Notice: Subject to any disclaimer, the term of this patent is extended or adjusted under 35 U.S.C. 154(b) by 0 days.

(21) Appl. No.: 13/333,300

(22) Filed: Dec. 21, 2011

(65) Prior Publication Data
US 2012/0112121 A1    May 10, 2012

Related U.S. Application Data

(62) Division of application No. 11/549,169, filed on Oct. 13, 2006, now abandoned.

(60) Provisional application No. 60/743,228, filed on Feb. 3, 2006, provisional application No. 60/731,793, filed on Oct. 31, 2005.

(51) Int. Cl.
  *C09K 5/00*     (2006.01)
  *C09K 5/10*     (2006.01)

(52) U.S. Cl.
  CPC ....................................... *C09K 5/10* (2013.01)
  USPC .................. 252/73; 252/70; 252/71; 252/74; 516/53

(58) Field of Classification Search
  CPC .............. C09K 5/00; C09K 5/10; C09K 5/12; C09K 5/20; C09K 5/048; C09K 2205/112; C09K 2205/12; C09K 2205/24
  USPC ............. 252/70, 71, 73, 74; 516/53, 54, 9, 20
  See application file for complete search history.

(56) References Cited

U.S. PATENT DOCUMENTS

| 4,076,637 A | * | 2/1978 | Hurst ............................ 508/150 |
| 4,259,206 A | | 3/1981 | Piotrowski |
| 5,013,464 A | * | 5/1991 | Sugimura et al. ............. 508/150 |
| 5,173,256 A | * | 12/1992 | Booth et al. ................... 420/590 |
| 5,281,364 A | * | 1/1994 | Stirling et al. ................ 252/512 |
| 5,698,138 A | | 12/1997 | Visca et al. |
| 5,849,213 A | | 12/1998 | Kawagoe et al. |

(Continued)

FOREIGN PATENT DOCUMENTS

WO    WO 96/18383    6/1996

OTHER PUBLICATIONS

B. Yang, J. L. Liu and K. L. Wang, G. Chen, "Simultaneous Measurements of Seebeck Coefficient and Thermal Conductivity Across Superlattice," American Institute of Physics, Applied Physics Letters; vol. 80, No. 10; pp. 1758-1760; Mar. 11, 2002.

(Continued)

*Primary Examiner* — Jane L Stanley
(74) *Attorney, Agent, or Firm* — AuerbachSchrot LLC

(57) ABSTRACT

A heat transfer fluid emulsion includes a heat transfer fluid, and liquid droplets dispersed within the heat transfer fluid, where the liquid droplets are substantially immiscible with respect to the heat transfer fluid and have dimensions that are no greater than about 100 nanometers. In addition, the thermal conductivity of the heat transfer fluid emulsion is greater than the thermal conductivity of the heat transfer fluid.

10 Claims, 4 Drawing Sheets

(56) References Cited

U.S. PATENT DOCUMENTS

| | | | |
|---|---|---|---|
| 5,904,933 A | 5/1999 | Riess et al. | |
| 6,022,487 A * | 2/2000 | Daume et al. | 252/70 |
| 6,160,061 A | 12/2000 | Berge et al. | |
| 2002/0019321 A1* | 2/2002 | Balliett | 508/246 |
| 2004/0228882 A1 | 11/2004 | Qiu et al. | |
| 2005/0130004 A1 | 6/2005 | Blunk et al. | |
| 2006/0027484 A1* | 2/2006 | Leck et al. | 208/108 |
| 2006/0040832 A1* | 2/2006 | Zhang et al. | 508/113 |

OTHER PUBLICATIONS

B. Yang, J. L. Liu and K. L. Wang, G. Chen, "Measurements of Anisotropic Thermoelectric Properties in Superlattices," American Institute of Physics, Applied Physics Letters; vol. 81, No. 19; pp. 3588-3590; Nov. 4, 2002.

Ce-Wen Nan and R. Birringer, David R. Clarke, H. Gleiter, "Effective Thermal Conductivity of Particulate Composites with Interfacial Thermal Resistance," American Institute of Physics; vol. 81, No. 10; pp. 6692-6699; May 15, 1997.

David R. Cahill, "Thermal Conductivity Measurement From 30 to 750 K: the 3ω Method," American Institute of Physics; Feb. 1990; pp. 802-808.

Stephen U. S. Choi, "Enhancing Thermal Conductivity of Fluids with Nanoparticles," Developments and Applications of Non-Newtonian Flows ASME 1995; FED—vol. 231/MD—vol. 66; pp. 99-103.

D. Hemanth Kumar, Hrishikesh E. Patel, V. R. Rajeev Kumar, T. Sundararajan, T. Pradeep, Sarit K. Das, "Model for Heat Conduction in Nanofluids," The American Physical Society; Physical Review Letters; vol. 93, No. 14; pp. 144301-1-144301-4; Oct. 1, 2004.

H. Xie, J. Wang, T. Xi, Y. Liu, "Thermal Conductivity of Suspensions Containing Nanosized SiC Particles," International Journal of Thermophysics; vol. 23, No. 2; Plenum Publishing Corporation, Mar. 2002, pp. 571-580.

J. A. Eastman, S. U. S. Choi, S. Li, W. Yu, L. J. Thompson, "Anomalously Increased Effective Thermal Conductivities of Ethylene Glycol-based Nanofluids Containing Copper Nanoparticles," American Institute of Physics; Applied Physics Letters; vol. 78, No. 6; pp. 718-720; Feb. 5, 2001.

J.H. Blackwell, "A Transient-Flow Method for Determination of Thermal Constants of Insulating Materials in Bulk", Journal of Applied Physics, vol. 25, No. 2; pp. 137-144; Feb. 1954.

Prajesh Bhattacharya and Patrick E. Phelan, "Thermal Conductivity of Nanoscale Colloidal Solutions (Nanofluids)", Physical Review Letters, PRL 94, 0125901 (2005); 4 pages; Jan. 21, 2005.

Sarit Kumar Das, Nandy Putra, Peter Thiesen and Wilfried Roetzel, "Temperature Dependence of Thermal Conductivity Enhancement for Nanofluids", Journal of Heat Transfer, vol. 125; pp. 567-574; Aug. 2003.

Eastman, J.A., Phillpot, S.R., Choi, S. U.S. & Keblinski, P., "Thermal Transport in Nanofluids", Annual Review of Materials Research 34; pp. 219-246; 2004.

Choi, S.U.S., Zhang, Z. G., Yu, W., Lockwood, F.E. & Grulke, E.A., "Anomalous Thermal Conductivity Enhancement in Nanotube Suspensions", Applied Physics Letters 79, pp. 2252-2254; 2001.

Yang, B. & Han, Z.H., "Temperature Dependent Thermal Conductivity of Nanorods-in-Oil Nanofluids", Applied Physics Letters; 2005.

Lockwood, F.E. et al., "The Current Development of Nanofluid Research", SAE World Congress; Detroit, MI; 2005.

Xuan, Y.M. & Li, Q., "Heat Transfer Enhancement of Nanofluids", International Journal of Heat and Fluid Flow 21, pp. 58-64; 2000.

Hoar, T.P. & Schulman, J.H., Transparent Water-in-Oil Dispersions: The Oleopathic Hydromicelle, Nature 152; Abstract; 1943.

Huxtable, S.T. et al., "Interfacial Heat Flow in Carbon Nanotube Suspensions", Nature Materials 2; pp. 731-734; 2003.

Patel, H.A., Garde, S. & Keblinski, P., "Thermal Resistance of Nanoscopic Liquid Interfaces: Dependence on Chemistry and Molecular Architecture", Nano Letters 5; pp. 2225-2231; 2005.

Keblinski, P., Eastman, J.A. & Cahill, D.G., "Nanofluids for Thermal Transport", Materials Today 8; pp. 36-44; 2005.

Dukhin et al., "Evolution of water-in-oil emulsion controlled by droplet-bulk ion exchange. Acoustic, electroacoustic, conductivity and image analysis," Dispersion Technology Inc., Newsletter 17, Apr. 2004.

Yang et al., "Thermal conductivity enhancement in water-in-FC72 nanoemulsion fluids," Applied Physics Letters, 88, 261914, 2006.

Ding et al., "Heat transfer intensification using nanofluids," KONA, No. 25 (http://www.kona.or.jp/search/25_023.pdf), 2007.

Yang et al., "Thermophysical characteristics of water-in-FC72 nanoemulsion fluids," Applied Physics Letters, 92, 013118, 2008.

Prasher et al., "Thermal Conductivity of Nanoscale Colloidal Solutions," Physical Review Letters, 94, 025901, 2005.

Han et al. (2011) "Synthesis of low-melting-point metallic nanoparticles with an ultrasonic nanoemulsion method," Ultrasonics 51:485-488.

Kim et al. (1995) "Preparation of PbTiO3 thin films using an alkoxide-alkanolamine sol-gel system," Journal of Materials Science 30:5639-5643.

\* cited by examiner

EMULSIONS OF HEAT TRANSFER FLUIDS INCLUDING NANODROPLETS TO ENHANCE THERMAL CONDUCTIVITIES OF THE FLUIDS

CROSS REFERENCE TO RELATED APPLICATIONS AND CLAIM TO PRIORITY

This application is a divisional of U.S. application Ser. No. 11/549,169, filed Oct. 13, 2006, which claims priority to U.S. Provisional Patent Application Ser. No. 60/743,228, entitled "New Type of Perfluorocarbon Based Nanofluids for Effective Heat Transfer," filed Feb. 3, 2006, and to U.S. Provisional Patent Application Ser. No. 60/731,793, entitled "A New Type of Perfluorocarbon Based Nanofluids for Effective Heat Transfer," filed Oct. 31, 2005, the disclosures of which are incorporated herein by reference in their entireties and to which priority is claimed.

FIELD OF THE INVENTION

The present invention relates to heat transfer fluids and, in particular, to the enhancement of the thermal conductivity of heat transfer fluids.

BACKGROUND

The use of heat transfer fluids for cooling or heating or thermally regulating components (e.g., microelectronics, optoelectronics, etc.) has become increasingly important for a wide range of industries and applications, including manufacturing, transportation and military operations. Given the increasing importance of heat transfer fluids, there is further a need for improving the thermal conductivity of such fluids so as to enhance the thermal properties and performance of these fluids for particular applications.

One approach to enhancing the thermal conductivity of heat transfer fluids is by adding solid particles to fluids, a well-known technique that has been investigated for at least the last several decades. Numerous theoretical and experimental studies have been conducted in relation to thermal properties of heat transfer fluids including solid particles or fibers. See, e.g., the following published documents, all of which are incorporated herein by reference in their entireties: S. U. S. Choi, *Developments and Applications of Non-Newtonian Flows*, edited by D. A. Siginer and H. P. Wang (ASME, New York, 1995), p. 99; J. A. Eastman, S. U. S. Choi, S. Li, et al., *Applied Physics Letters* 78, 718 (2001); S. U. S. Choi, Z. G. Zhang, W. Yu, et al., *Applied Physics Letters* 79, 2252 (2001); S. K. Das, N. Putra, P. Thiesen, et al., *Transactions of the ASME. Journal of Heat Transfer* 125, 567 (2003); H. E. Patel, S. K. Das, T. Sundararajan, et al., *Applied Physics Letters* 83, 2931 (2003); D. H. Kumar, H. E. Patel, V. R. R. Kumar, et al., *Physical Review Letters* 93, 144301/1 (2004); and R. Prasher, P. Bhattacharya, and P. E. Phelan, *Physical Review Letters* 94, 025901/1 (2005). The early studies into such heat transfer fluid systems have been limited to fluids containing solid particles on the order of millimeters or micrometers (microns) in size or dimension. However, one problem associated with such fluids is that the particles tend to settle out of the solutions. Another problem is that the solid particles can become lodged or can clog microchannels of equipment in which the heat transfer fluid flows.

Recent advances in heat transfer fluids involve the use of solid nanoparticles, or particles having dimensions in the range of 1 nm to 100 nm, in heat transfer fluids (also referred to as "nanofluids"). The nanofluids do not suffer from the problems noted above for heat transfer fluids utilizing larger sized solid particles. In addition, such nanofluids have been demonstrated to have enhanced thermal conductivity. For example, one study has shown that the dispersion of copper nanoparticles within ethylene glycol results in an increase in thermal conductivity by about 40% for volume fractions of about 0.3%. See J. A. Eastman, S. U. S. Choi, S. Li, et al., *Applied Physics Letters* 78, 718 (2001).

However, there remains a question regarding the ability to effectively mass-produce nanofluids (i.e., heat transfer fluids containing nano-sized solid particles). In addition, there is a concern regarding the long-term stability of nanofluids. In view of these concerns, the use of current nanofluids in different industries and applications has been somewhat limited.

Accordingly, a need exists for providing heat transfer fluids with enhanced thermal conductivities and other thermal properties and which are stable and reliable for use for a wide variety of different applications.

SUMMARY

The present invention provides heat transfer fluids with enhanced thermal conductivities and other thermal properties, where the heat transfer fluids include suspensions of liquid nanodroplets that are stable in solution and are capable of being mass-produced.

In accordance with the present invention, a heat transfer fluid emulsion comprises a heat transfer fluid, and liquid droplets dispersed within the heat transfer fluid, where the liquid droplets are substantially immiscible with respect to the heat transfer fluid and have dimensions that are no greater than about 100 nanometers.

In accordance with another embodiment of the invention, a method of forming a heat transfer fluid emulsion comprises combining a heat transfer fluid with a material that is substantially immiscible with respect to the heat transfer fluid, and mixing the material in the heat transfer fluid to form an emulsion comprising liquid droplets dispersed within the heat transfer fluid, where the liquid droplets have dimensions that are no greater than about 100 nanometers.

The thermal conductivity of the resultant emulsion that is formed is greater than the thermal conductivity of the heat transfer fluid.

The above and still further features and advantages of the present invention will become apparent upon consideration of the following detailed description of specific embodiments thereof, particularly when taken in conjunction with the accompanying drawings.

DETAILED DESCRIPTION

Figure 1:
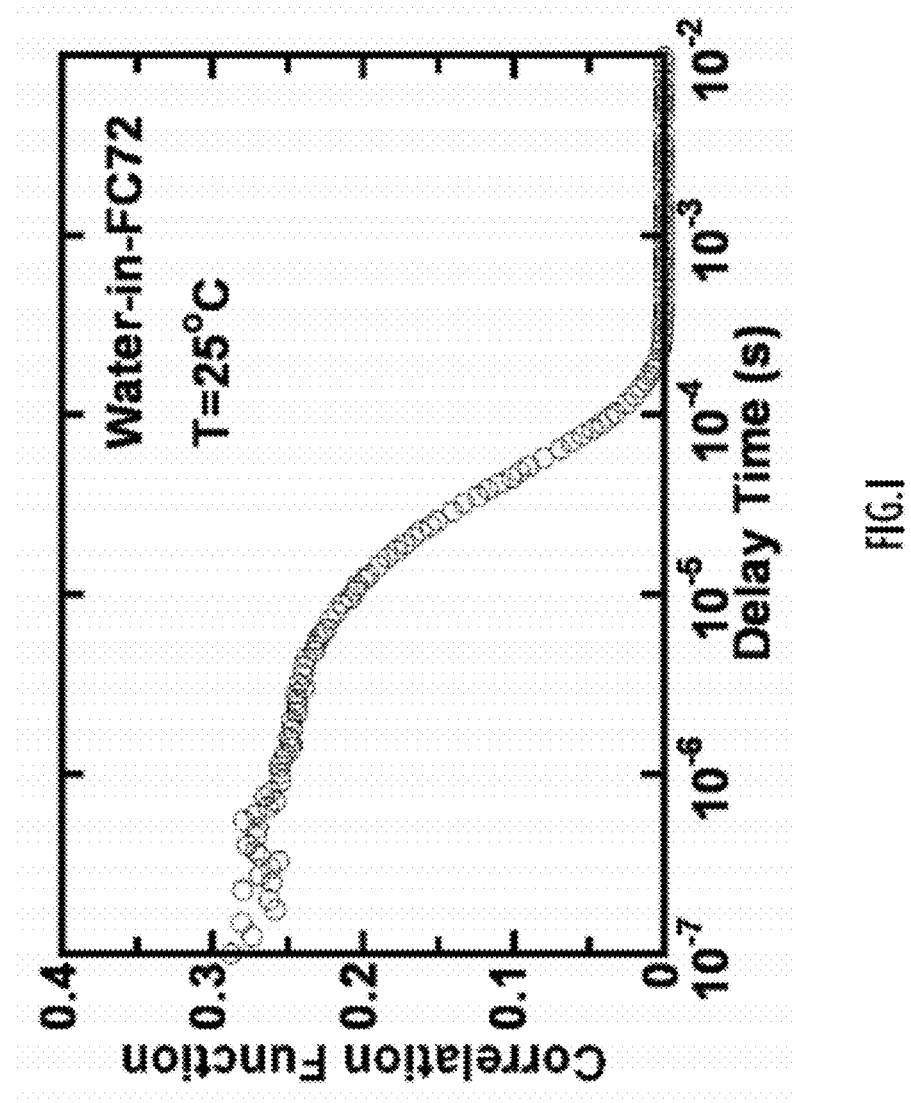
FIG. 1 is a plot of correlation function of scattered light vs. time for a water/FC72 nanoemulsion heat transfer fluid of the present invention.

In accordance with the present invention, a heat transfer fluid is provided including liquid nanodroplets suspended throughout the heat transfer fluid so as to form a nanoemulsion. The heat transfer fluid nanoemulsions that are formed in accordance with the invention exhibit enhanced thermal conductivity and are further stable over long periods of time (e.g., for several months and longer). The nanodroplets suspended within the nanoemulsion exhibit high mobility and diffusivity within the fluid. In addition, the heat transfer fluid emulsion can be mass produced with relative ease.

As used herein, the term "nanodroplet" refers to liquid droplets within the heat transfer fluid having sizes or dimensions (e.g., diameters) that are no greater than about 100 nanometers (nm). In addition, the term "nanoemulsion", as used herein, refers to emulsions of heat transfer fluids with nanodroplets of liquid dispersed within the heat transfer fluid.

The novel concept of using liquid nanodroplets for improving heat transfer in fluids is an improvement upon the studies for enhancing thermal conductivity in heat transfer fluids containing solid nanoparticles (referred to as "nanofluids" as noted above). It is important to note that the strategy of adding solid particles to improve thermal properties of heat transfer fluids has been pursued for more than one hundred years. As is well known, the thermal conductivity (k) of a fluid is the measure of the quantity of heat (Q) transmitted in time (t) through a selected distance (L) of the fluid, in a direction normal to a surface area (A) of the fluid and as a result of a temperature difference ($\Delta T$). The thermal conductivity (k) has the units $Wm^{-1}K^{-1}$ and is defined by the following formula:

$$k=Q/t*L/(A*\Delta T)$$

Although various possible mechanisms have been suggested, particle Brownian motion is now considered to be the primary mechanism for the enhanced thermal conductivity in nanofluids. Based upon this understanding, the liquid nanodroplets dispersed in heat transfer fluids according to the invention must be in Brownian motion and should enhance heat transport in the base fluids. In fact, the enhancement of thermal conductivity of heat transfer fluids by liquid nanodroplets in accordance with the invention has been experimentally demonstrated as described below.

The nanoemulsion fluids of the invention can include one or more conventional or other heat transfer fluids having suitable thermal conductivities for a particular application. Exemplary heat transfer fluids that can be used to form nanoemulsions in accordance with the invention include, without limitation, liquid hydrocarbons such as substituted or non-substituted alkanes and polyolefins (e.g., aliphatic compounds including five or more carbon atoms, aromatic compounds such as benzene and toluene, engine oils, polyalphaolefins (POAs), etc.), mineral oils, antifreeze solutions (e.g., ethylene glycol, propylene glycol, and diethylene glycol), and silicone oils, fluorocarbon liquids and water (e.g., deionized water). Exemplary liquid hydrocarbons are engine or motor oils (e.g., synthetic oils) that include polyalphaolefin (POA) compounds.

Preferable fluorocarbon liquids are perfluorocarbon (PFC) liquids including, without limitation, the FC series of fluorocarbon liquids including one or a combination of perflourocarbon compounds including 6-10 carbon atoms (e.g., any one or combination of perflourohexane, perfluoro octane, and perfluoro decane). An exemplary perflourocarbon liquid suitable for use as a heat transfer fluid is perfluorohexane, commercially available under the tradename FC72 from 3M Corporation. All of the heat transfer fluids described above are preferably in a liquid state at least at ambient or room temperature (e.g., at a temperature of about 22-27° C.).

In addition, the liquid nanodroplets formed in the heat transfer fluid can include any one or combination of the liquids described above for the heat transfer fluid. The liquid to be dispersed as nanodroplets within the heat transfer fluid is selected to be substantially non-miscible or substantially immiscible in the heat transfer fluid so as to facilitate the formation of a nanoemulsion when these two fluids are combined. The different fluids described above can be grouped into three basic categories of fluids that are substantially immiscible with respect to each other: water, liquid hydrocarbon compounds (e.g., oils), and liquid perfluorocarbon (PFC) compounds. In particular, the liquid hydrocarbon compounds and liquid PFC compounds described above have varying degrees of hydrophobicity and are not miscible with water or with each other. Thus, the nanoemulsion fluids that can be formed in accordance with the present invention can be any combination of the following: water nanodroplets dispersed in liquid hydrocarbon compounds, hydrocarbon nanodroplets dispersed in water, water dispersed in liquid PFC compounds, PFC nanodroplets dispersed in water, PFC nanodroplets dispersed in liquid hydrocarbon compounds, and hydrocarbon nanodroplets dispersed in liquid PFC compounds.

In exemplary embodiments, water-in-PFC heat transfer fluids can be formed utilizing any suitable emulsifying technique (e.g., any of the techniques described below). For example, stable nanoemulsions of water-in-FC72 (i.e., perfluorohexane) can be easily formed in accordance with the invention, where water (e.g., deionized water) is added to FC72 in a selected amount (preferably no greater than about 20% by volume).

The nanoemulsion fluids of the present invention can be formed by combining the heat transfer fluid with liquid that is substantially immiscible with respect to the heat transfer fluid, and then suitably mixing and/or rupturing the material within the heat transfer fluid to form the nanodroplets therein. Any suitable technique can be used to achieve such mixing and/or rupturing of the liquid in the heat transfer fluid to form such nanodroplets (i.e., droplets having a dimension of no greater than about 100 nm). For example, the nanodroplets can be formed in the heat transfer fluid using an ultrasonic mixing technique, micro-fluidic stirring technique and/or a high-speed stirring technique. In an ultrasonic mixing technique, the nanoemulsion can be formed by combining the substantially immiscible liquid with the heat transfer fluid and subjecting the fluid to ultrasonic mixing for a selected time period from several seconds to tens of seconds using an ultrasonic disrupter (e.g., using a model commercially available under the trademark Vibra-Cell from Sonics & Materials, Inc., Connecticut). These techniques result in a shearing of the liquid within the heat transfer fluid that achieves suitable emulsification of nanodroplets within the fluid. In addition, the nanoemulsification process can be easily scaled up with suitable equipment to produce bulk quantities of nanoemulsion fluids.

Preferably, a suitable emulsifier, such as an amphiphilic surfactant, is provided in the synthesis of the nanoemulsion to stabilize the nanodroplets so as to prevent or minimize coalescence. The surfactant molecule consists of a hydrophobic region and a hydrophilic region (or a region having less hydrophobicity in comparison to the first hydrophobic region). The hydrophobic region is non-polar and includes aliphatic and/or aromatic hydrocarbon residues or substituted (e.g., fluorinated) counterparts. The hydrophilic (or less hydrophobic) region includes polar groups (e.g., hydroxyl, carboxyl, and/or ionic groups) which can interact strongly with water. The surfactant molecules adsorb strongly around the nanodroplet to lower the interfacial tension and to provide a stabilizing repulsion between nanodroplets. Selection of a suitable surfactant, with particular regard to the molecular structure of the surfactant (e.g., size of different groups in the surfactant molecule, the length of hydrocarbon or fluorocarbon chains, presence of branches, etc.), will enhance the size and stability of nanodroplets formed in the nanoemulsion heat transfer fluid. The emulsifier or surfactant can be provided in an amount of about 5% or less by volume of the nanoemulsion fluid to enhance and stabilize the nanodroplets formed in the fluid in accordance with the invention.

Exemplary surfactants that can be used to enhance and stabilize the formation of nanodroplets within heat transfer fluids include, without limitation, sodium or potassium salts of long-chain fatty acids (eg., $CH3(CH2)nCOONa$) and sodium dodecyl sulphate ($CH3(CH2)11OSO2ONa$) that can be used in nanoemulsions including water and hydrocarbon; fluorinated polyoxyethylene alkyl ether ($F(CF_2)_nC_2H_4(OC_2H_4)_mOH$), $CF3(CF2)nCOOH$, $CF3(CF2)nCOONa$, $CF3(CF2)nOH$ that can be used in nanoemulsions including water and fluorocarbon; and $CF3(CF2)n(CH2)mCH3$ that can be used in nanoemulsions including hydrocarbon and fluorocarbon.

Further, other components that can be used to form nanodroplets in the heat transfer fluids of the types described above are phase change materials such as metals having low melting points. In particular, metals or combinations of metals or metal alloys that are preferably at a liquid state at or near ambient or room temperatures can be used in forming the nanodroplets in a heat transfer fluid. An exemplary low melting point metal that can be used to form a nanoemulsion in accordance with the invention is gallium (Ga), which has a melting point slightly above ambient or room temperature (about 30° C.). For example, gallium can be combined with a polyalphaolefin (PAO) heat transfer fluid to form a Ga-in-PAO nanoemulsion in accordance with the invention, where nanodroplets of Ga are dispersed within the PAO fluid.

In an exemplary embodiment, a nanoemulsion including droplets of Ga in a PAO can be formed in which the nanodroplets have a radius in the range of about 20 nm or less (as determined by light scattering measurements). The PAO used to form the Ga-in-PAO nanoemulsion can be a synthetic oil commercially available under the trademark Synfluid® PAO 2 cSt (Chevron Phillips Chemical Company, Texas).

Low melting point (LMP) metal alloys that can also be used to form nanodroplets in heat transfer fluids according to the invention include any two or more combinations of bismuth (Bi), cadmium (Cd), tin (Sn), lead (Pb), and indium (In). Exemplary LMP metal alloys that can be used to form nanodroplets include, without limitation: an alloy of Bi (44.7% by weight), Pb (22.6% by weight), In (19.1% by weight), Sn (8.3% by weight) and Cd (5.3% by weight); an alloy of Bi (49.0% by weight), Pb (18.0% by weight), In (21.0% by weight) and Sn (12.0% by weight); an alloy of Bi (32.5% by weight), In (51.0% by weight) and Sn (16.5% by weight); an alloy of Bi (50.0% by weight), Pb (26.7% by weight), Sn (13.3% by weight) and Cd (10.0% by weight); an alloy of Bi (52.5% by weight), Pb (32.0% by weight) and Sn (15.5% by weight); an alloy of Bi (55.5% by weight) and Pb (44.5% by weight); an alloy of Bi (58.0% by weight) and Sn (42.0% by weight); and an alloy of Bi (40% by weight) and Sn (60% by weight). The LMP metal alloys have melting points ranging from about 29° C. to about 170° C. or greater. These LMP metal alloys can also be combined with PAO fluids or any of the other types of heat transfer fluids as noted above (e.g., water or PFC fluids) to form a suitable nanoemulsion or nanofluid.

A number of water-in-FC72 nanoemulsion fluids (at different concentrations of water in FC72 fluid) were formed in accordance with the invention utilizing an appropriate technique such any of the techniques described above (e.g., an ultrasonic mixing technique). The water-in-FC72 nanoemulsion fluids were tested to determine the degree of enhanced thermal conductivity and stability of the fluids. The water-in-FC72 nanoemulsion fluids formed are transparent, but were observed to scatter light due to the Tyndall effect. This indicates that FC72 and water are not molecularly dispersed but rather form a micro or nanoemulsion system. After a period of one year, no bulk phase separation can be observed in the water-in-FC72 nanoemulsions. In addition, these nanoemulsion fluids were demonstrated to be freeze/thaw recoverable (i.e., no significant change in dispersion or size of nanodroplets in the emulsion upon being frozen and thawed).

A Dynamic Light Scattering (DLS) technique was used to measure the size and Brownian diffusivity of the water nanodroplets in the nanoemulsion. The DLS technique was conducted in accordance with the technique set forth in B. Chu, *Laser light scattering* (Academic Press, New York, 1974), the disclosure of which is incorporated herein by reference in its entirety. The autocorrelation function of the scattered light for a water-in-FC72 nanoemulsion liquid containing 12% by volume water is plotted in FIG. 1. The curve shows a typical exponential decay of the correlation function as a function of time. Based upon this technique, the Brownian Diffusivity and hydrodynamic radius of the nanodroplets in this nanoemulsion were respectively determined to be about $3.5 \times 10^{-7}$ cm$^2$/s and about 9.8 nm (at a temperature of 25° C.). Little change in the average nanodroplet radius was observed when the nanoemulsion fluid is diluted with FC72 (i.e., to reduce the concentration of water in the liquid emulsion).

The fluid thermal conductivities of the water-in-FC72 nanoemulsions were measured utilizing a 3ω-wire method, which has been described by B. Yang and Z. H. Han, *International Symposium on EcoTopia Science* 2005, *ISETS*05, Nagoya University, Japan, Aug. 8-9 (2005), the disclosure of which is incorporated herein by reference in its entirety. The 3ω-wire method is based upon a combination of the 3ω method and the hot-wire method, and these methods are known from the following references, each of which is incorporated herein by reference in its entirety: D. G. Cahill, *Review of Scientific Instruments* 61, 802 (1990); B. Yang, W. L. Liu, J. L. Liu, et al., *Applied Physics Letters* 81, 3588 (2002); B. Yang, J. L. Liu, K. L. Wang, et al., *Virtual Journal of Nanoscale Science & Technology* 80, 1758 (2002); and J. H. Blackwell, *Journal of Applied Physics* 25, 137 (1954).

In the 3ω-wire system, a metal wire with insulation coating is suspended in the nanoemulsion liquid, where the wire acts as both a heater and a thermometer. A sinusoidal current at frequency ω is passed through the metal wire, and a heat wave at frequency 2ω is generated in the liquid. The 2ω temperature rise of the wire is determined by the voltage component at frequency 3ω. The liquid thermal conductivity is then calculated by measuring the slope of the straight lines of data generated, where the thermal conductivity of the liquid (k) is inversely proportional to the slope of the 2ω temperature rise of the wire as a function of the driven frequency ω.

One advantage of using the 3ω-wire method is that the temperature oscillation can be maintained small enough (below 2K, compared to about 5K for the hot-wire method) within the test liquid to retain constant liquid properties. Calibration experiments were performed for liquid hydrocarbons (oils), fluorocarbons and deionized water at atmospheric pressure, and the results were determined to be similar to literature values for the same liquids with an error of less than 1%.

Figure 2:
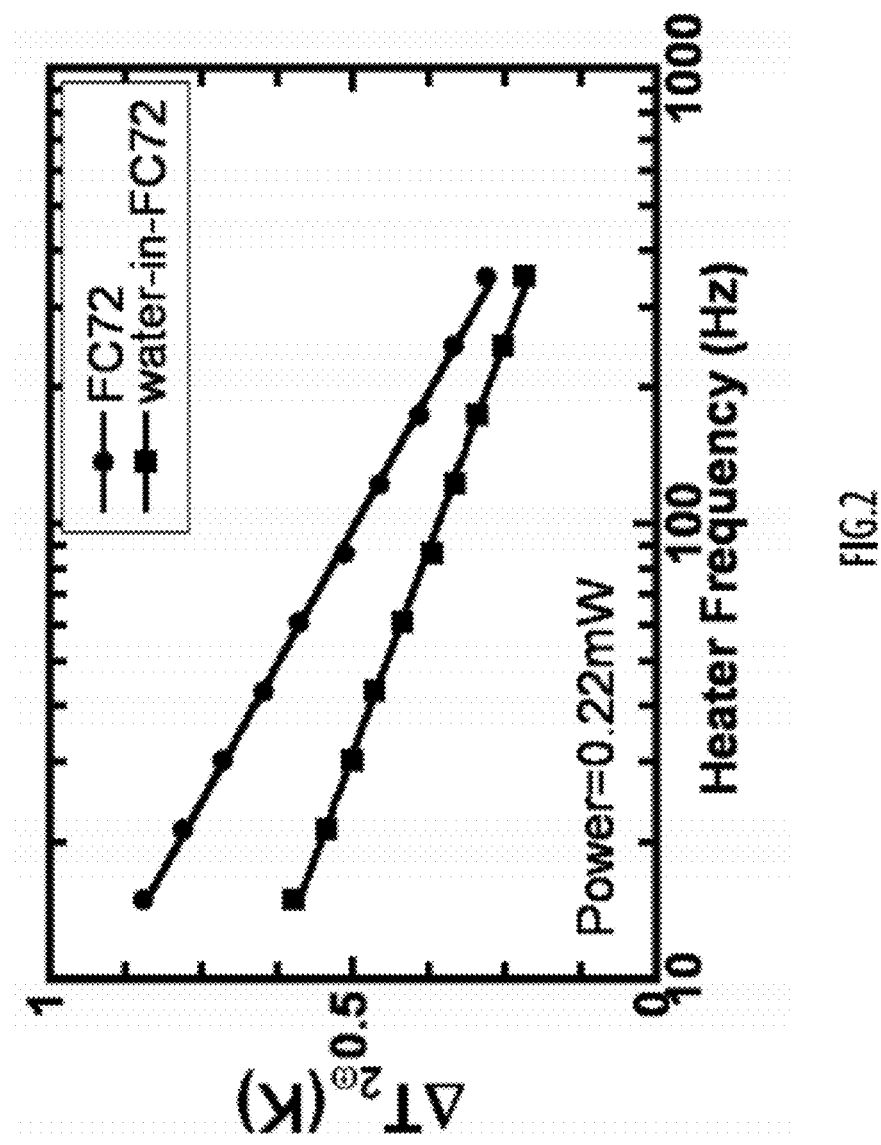
FIG. 2 is a plot showing the comparison of temperature oscillation vs. heater frequency for a metal wire immersed in FC72 heat transfer fluid and a water/FC72 nanoemulsion heat transfer fluid in accordance with the invention.

The raw experimental data obtained for FC72 liquids and water-in-FC72 nanoemulsion liquids (at 12% by volume deionized water) utilizing the 3ω-wire method are plotted in FIG. 2. The thermal conductivities of the liquids are determined from the slopes of the 2ω temperature oscillation curves. The less-steep curve (i.e., the curve with the smaller slope) represents the water-in-FC72 nanoemulsion fluid, indicating that this fluid has a higher thermal conductivity than the pure FC72 liquid. The thermal conductivity of the pure FC72 liquid was determined experimentally to be 0.056 W/mK at room temperature (about 25° C.), which corresponds with the literature data for this liquid.

Figure 3:
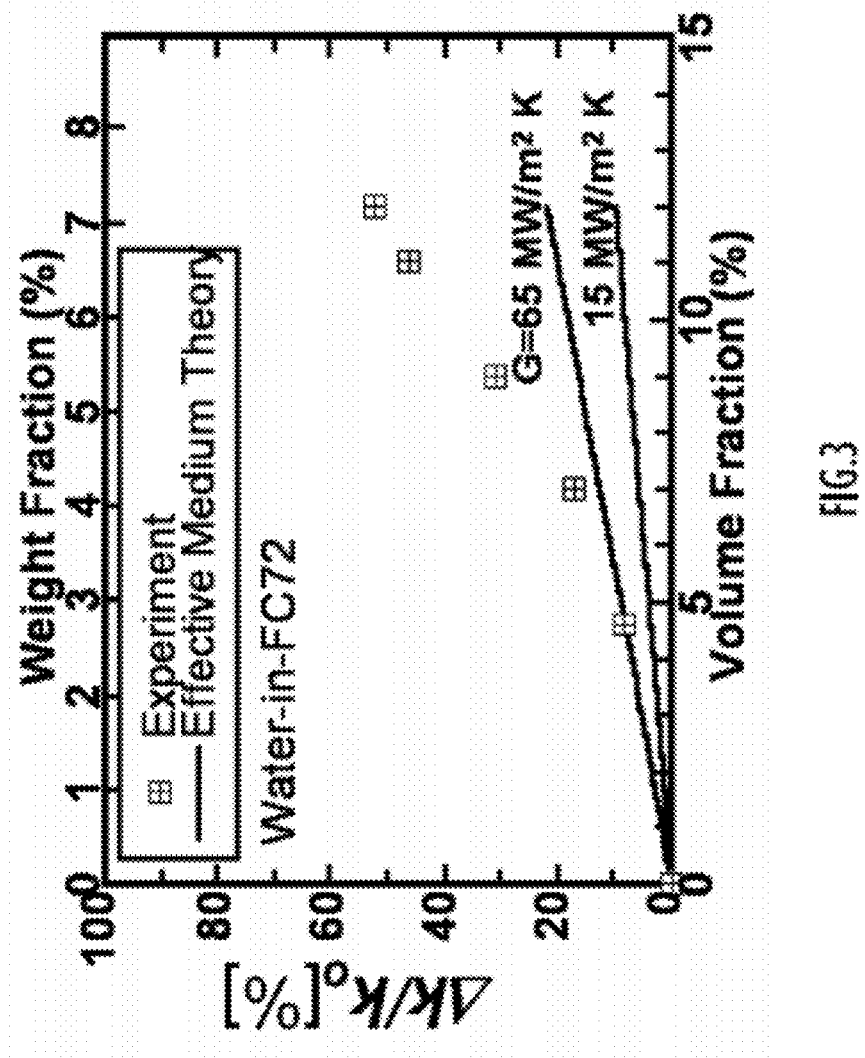
FIG. 3 is a plot of thermal conductivity enhancement vs. concentration of water in FC72 heat transfer fluid, with a comparison of theoretical values and actual experimental values utilizing the nanoemulsion heat transfer fluid of the invention.

The plot in FIG. 3 shows the thermal conductivity enhancement (i.e., % increase in thermal conductivity) in water-in-FC72 nanoemulsion fluids as a function of the loading of water nanodroplets in the FC72 fluid. Theoretical or predicted data for such water loading of FC72 liquid, which was obtained utilizing the Effective Medium Theory (EMT), is also plotted for comparison purposes in FIG. 3. The Effective Medium Theory has been described in C. W. Nan, R. Birringer, D. R. Clarke, et al., *Journal of Applied Physics* 81, 6692 (1997), the disclosure of which is incorporated herein by reference in its entirety. The data plotted in FIG. 3 is further normalized to the thermal conductivity of FC72 containing no water, so as to provide an indication of enhancement in thermal conductivity due to the water loading at a select concentration. As can be seen by the data plotted in FIG. 3, an increase in concentration of water in the water-in-FC72 nanoemulsions formed yielded an increase in thermal conductivity enhancement. In particular, for water loading of 12% by volume (7.1% by weight) in a water-in-FC72 nanoemulsion, the thermal conductivity increases by about 52% in comparison to an FC72 fluid without any water nanodroplets.

It can also be seen in FIG. 3 that the observed enhancement in thermal conductivity for water nanodroplets in FC72 fluids is much larger than those predicted by EMT at a concentration of 12% by volume of water in FC72 fluid. In the EMT predictions, thermal resistance between the immiscible water and FC72 fluid is considered. Since there was no literature or reported values for thermal interfacial resistance between water and fluorocarbon, values of 65 MW/m² K (for the water-octane interface) and 15 MW/m² K (for the alkane-toluene interface) were used to estimate the effective thermal conductivity of the water/FC72 nanoemulsion fluids based on the EMT. The greater conductivity enhancement as observed by experimentation indicates that thermal diffusion is not the only thermal conduction mechanism and other mechanisms that are not considered in EMT, such as Brownian motion of nanodroplets and liquid layering at the interfaces, also play an important role in the thermal conductivity enhancement of the water-in-FC72 nanoemulsion fluid.

Figure 4:
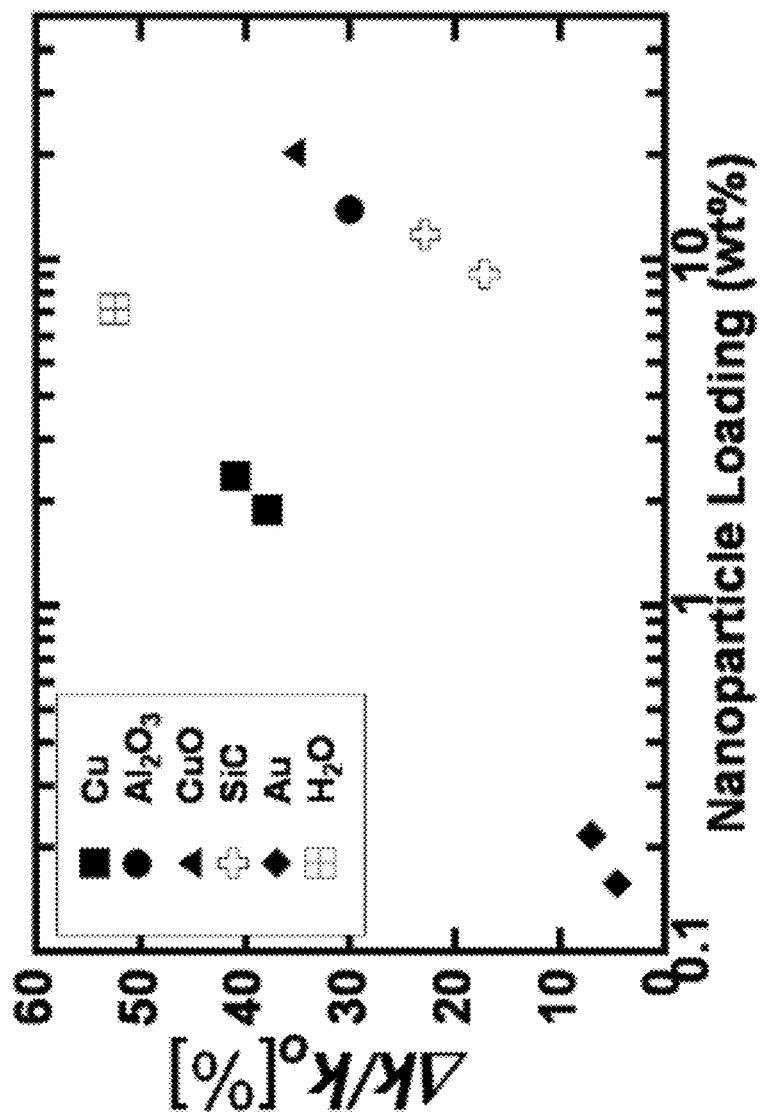
FIG. 4 is a plot comparing the thermal conductivity enhancement of a nanoemulsion heat transfer fluid of the invention with other known nanofluids.

FIG. 4 shows a comparison of the thermal conductivity enhancement of a nanoemulsion fluid formed in accordance with the invention with other, conventional nanofluids that have been loaded with solid particles. In particular, the thermal conductivity enhancement data for the nanoemulsion heat transfer fluid depicted in FIG. 4 is for a water-in-FC72 nanoemulsion including water nanodroplets at a concentration of about 12% by volume (about 7.1% by weight) within the fluid. The other data points in FIG. 4 represent thermal conductivity enhancement values for the following nanofluids known in the art: copper particles in ethylene glycol fluids (as reported in J. A. Eastman, S. U. S. Choi, S. Li, et al., *Applied Physics Letters* 78, 718 (2001)); aluminum oxide ($Al_2O_3$) particles in fluids (as reported in H. Masuda, A. Ebata, K. Teramae, et al., *Netsu Bussei* (Japan) 4, 227 (1993)); copper oxide (CuO) particles in fluids (as reported in S. K. Das, N. Putra, P. Thiesen, et al., *Transactions of the ASME. Journal of Heat Transfer* 125, 567 (2003)); SiC particles in fluids (as reported in H. Xie, J. Wang, T. Xi, et al., *International Journal of Thermophysics* 23, 571-580 (2002)); and gold particles in fluids (as reported in H. E. Patel, S. K. Das, T. Sundararajan, et al., *Applied Physics Letters* 83, 2931 (2003)).

The addition of water nanodroplets at 12% by volume (7.1% by weight) in the water-in-FC72 fluid results in an increase in thermal conductivity of about 52% for the heat transfer fluid. In comparison, of the other conventional nanofluids with solid particles set forth in FIG. 4, the Cu particles dispersed in ethylene glycol result in the highest increase or enhancement in thermal conductivity (about 40%).

Thus, the nanoemulsions described above provide a high thermal conductivity enhancement for heat transfer fluids in relation to conventional nanofluids utilizing solid particles. The loading of nanodroplets in the nanoemulsions of the invention have further been demonstrated to be stable over extended periods of time, and can be used in microchannels or micro-nozzles of fluidic devices without the potential of clogging such fluid passages. Further, the nanoemulsion heat transfer fluids of the invention can be produced with relative ease in large or bulk quantities for a wide variety of different applications including, without limitation, for nanotechnology-based cooling applications requiring ultrahigh thermal conductivity coolants, as lubricants, as hydraulic fluids, and as metal-cutting fluids.

Having described exemplary embodiments for forming emulsions of heat transfer fluids including nanodroplets to enhance the thermal conductivity of the heat transfer fluids, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed:

1. A heat transfer fluid emulsion comprising:
   (I) a heat transfer fluid comprising a liquid fluorocarbon compound;
   (II) liquid droplets dispersed within the heat transfer fluid, wherein the liquid droplets consist of a metal or a metal alloy that is in a liquid state, wherein the liquid droplets are substantially immiscible with respect to the heat transfer fluid, and have dimensions that are no greater than about 100 nanometers; and
   (III) an amphiphilic surfactant adsorbed around the liquid droplets to enhance size and stability of the liquid droplets within the heat transfer fluid, wherein said amphiphilic surfactant comprises fluorinated polyoxyethylene alkyl ether.

2. The emulsion of claim 1, wherein the emulsion has a greater thermal conductivity than the heat transfer fluid.

3. The emulsion of claim 1, wherein the heat transfer fluid comprises the liquid fluorocarbon compound, and the liquid fluorocarbon compound comprises perfluorohexane.

4. The emulsion of claim 1, wherein the metal comprises gallium.

5. The emulsion of claim 1, wherein the liquid droplets have dimensions that are about 20 nanometers or less.

6. A method of forming a heat transfer fluid emulsion comprising:
  providing a heat transfer fluid comprising a liquid fluorocarbon compound;
  combining the heat transfer fluid with a liquid that is substantially immiscible with respect to the heat transfer fluid and an amphiphilic surfactant, wherein the amphiphilic surfactant comprises fluorinated polyoxyethylene alkyl ether; and
  mixing the liquid and the surfactant in the heat transfer fluid to form an emulsion comprising liquid droplets dispersed within the heat transfer fluid, wherein the liquid droplets consist of a metal or a metal alloy that is in a liquid state,
  wherein the liquid droplets have dimensions that are no greater than about 100 nanometers, and the amphiphilic surfactant is absorbed around the liquid droplets to enhance size and stability of the liquid droplets within the heat transfer fluid.

7. The method of claim 6, wherein the emulsion formed from mixing the material in the heat transfer fluid has a greater thermal conductivity than the heat transfer fluid.

8. The method of claim 6, wherein the heat transfer fluid comprises the fluorocarbon compound, and the fluorocarbon compound comprises perfluorohexane.

9. The method of claim 6, wherein the metal comprises gallium.

10. The method of claim 6, wherein the mixing of the material in the heat transfer fluid comprises ultrasonic mixing to obtain the emulsion comprising liquid droplets dispersed within the heat transfer fluid.

* * * * *